Oct. 9, 1945.  J. A. FILLERY  2,386,671
MICROMETER INDICATOR FOR TOOLS
Filed Aug. 24, 1942
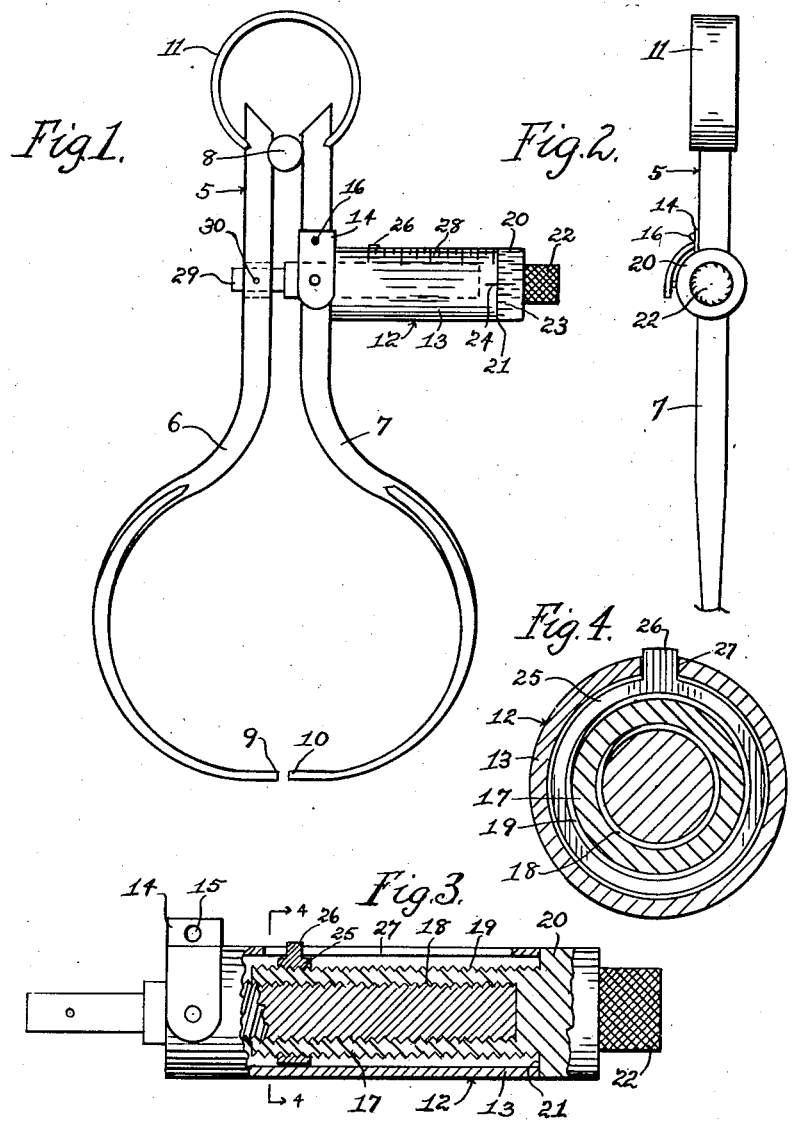
INVENTOR.
James A. Fillery
BY
W. W. Williamson
Atty.

Patented Oct. 9, 1945

2,386,671

UNITED STATES PATENT OFFICE 2,386,671

MICROMETER INDICATOR FOR TOOLS

James A. Fillery, Philadelphia, Pa.

Application August 24, 1942, Serial No. 456,113

3 Claims. (Cl. 33—154)

My invention relates to a new and useful micrometer indicator for tools and gas for one of its objects to provide a structure that will give micrometer indications of the distance between spaced points of separable jaws, legs and the like of tools which in themselves are not measuring instruments.

Another object of the invention is to provide a micrometer indicator in combination with a tool having means that can be adjusted to positions for obtaining measurements.

A further object of the present invention is to provide a micrometer indicator for calipers whereby micrometer readings may be obtained of measurements taken by the calipers.

With the above and other objects in view the invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which—

Fig. 1 is a face view of a micrometer indicator for tools showing the micrometer structure combined with a pair of calipers.

Fig. 2 is an edge view thereof.

Fig. 3 is an enlarged sectional elevation of the micrometer structure detached from the tool.

Fig. 4 is a section on the line 4—4 of Fig. 3.

In carrying out my invention as herein embodied 5 represents a tool which, as shown herein, is illustrated as a pair of calipers comprising two legs 6 and 7, fulcrumed at 8, with the toes 9 and 10 urged apart by a spring 11. It is to be understood that wherever the term legs is used this is to cover equivalent means or structure such as jaws, clamp members and the like. Also it is my intention to include these elements whether pivoted together or are mounted for relative parallel movements.

The indicator 12 comprises a hollow tubular barrel 13 provided at one end with an integral attaching plate 14 of suitable configuration to conform to the contour of one of the legs, as 7, of the calipers. Said plate has a hole 15 for the reception of the fastening device 16, such as a screw, which is projected into the leg 7 to pivot the indicator barrel to said leg 7.

A sleeve 17, having internal threads 18 and external threads 19, is rotatably mounted in the barrel 13. This sleeve has a head 20 located outside of the outer end of said barrel which is engaged by the shoulder 21 at the inner end of the head. For convenience of rotating the sleeve, a knob 22 projects from the head 20 and is knurled or otherwise roughened to prevent slippng. On the circumference of the head 20 is delineated a micrometer scale 23 which cooperates with a zero indication point 24 on the outer surface of the barrel 13. A follower nut 25 has threaded engagement with the exterior of the sleeve 17 so as to move to and fro thereon within the barrel 13 and said follower nut carries a lug 26 that projects through a longitudinal slot 27 formed in said barrel. Delineated on the surface of the barrel contiguous at least one edge of said slot is a scale 28 with which the lug 26 cooperates to determine the major distances of movements of the toes 9 and 10.

An adjusting screw 29 has threaded connection with the interior of the sleeve 17 and projects from the inner end of the barrel 13 and through both legs of the tool or calipers and is pivoted to the leg 6 at 30.

The scale 28 will provide the major measurement and then the indication marks between the zero mark 24 and the primary mark on the scale 23 will indicate the additional distance in thousandths of an inch. It will be obvious that the scale markings must be made to coincide with the relative positions of the tool fulcrum and the toes and the micrometer to one another.

Of course I do not wish to be limited to the exact details of construction herein shown and described as these may be varied within the scope of the appended claims without departing from the spirit of my invention.

Having described my invention, what I claim as new and useful is:

1. A device of the kind described consisting of a hollow tubular body provided with a longitudinal slot, means to pivotally attach the inner end of said body to the leg of a tool, a sleeve rotatably mounted in said body and having internal and external threads, a head on the sleeve abutting the outer end of the body, a scale on the circumference of said head, a zero mark on the body with which said scale cooperates, a knob on the head whereby rotary motion may be imparted to the sleeve, a follower nut slidable lengthwise of the body in which it is mounted and having threaded connection with the exterior of the sleeve, a lug on said follower nut and projecting through the slot, a scale delineated on the outside surface of the body contiguous the slot and with which the lug cooperates, an adjusting screw having threaded engagement with the interior of the sleeve and protruding from the inner end of the body for coaction with another leg of a tool, and means to pivotaly attach the protruding end of said adjusting screw to said other leg of the tool.

2. A micrometer indicator for tools comprising, a barrel adapted to be pivotally attached to one leg of a pair of calipers, said barrel having a longitudinal slot therein, a scale delineated on the barrel contiguous the slot, a sleeve rotatably mounted in said barrel and having internal and external threads, a scale on said sleeve for cooperation with a zero mark on the barrel, a follower nut having threaded engagement with the exterior of said sleeve and provided with means projecting into the slot and cooperating with the scale contiguous the slot, and an adjusting screw having threaded engagement with the interior of the sleeve and projecting from the inner end of said barrel and adapted to be pivotally attached to the other leg of the calipers.

3. The micrometer indicator of claim 2 wherein the sleeve has a head abutting the outer end of the barrel, and a knob protruding from said head.

JAMES A. FILLERY.